(12) United States Patent
Hubenthal et al.

(10) Patent No.: US 7,318,566 B2
(45) Date of Patent: Jan. 15, 2008

(54) AIRCRAFT WITH A LIFT SYSTEM

(75) Inventors: Wolfgang Hubenthal, Hamburg (DE); Joerg Damitz, Runkel (DE); Florian Windischbauer, Lindau (DE); Bernd Roessner, Rosengarten (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 11/233,889

(22) Filed: Sep. 23, 2005

(65) Prior Publication Data

US 2007/0215754 A1 Sep. 20, 2007

Related U.S. Application Data

(60) Provisional application No. 60/631,335, filed on Nov. 29, 2004.

(30) Foreign Application Priority Data

Sep. 23, 2004 (DE) .................. 10 2004 046 146

(51) Int. Cl.
*B64C 1/22* (2006.01)
(52) U.S. Cl. .................................. 244/137.2
(58) Field of Classification Search ............. 244/137.1, 244/137.2, 118.1, 118.5, 125, 127, 129.5, 244/129.4; 187/267, 268, 270, 239
See application file for complete search history.

(56) References Cited

U.S. PATENT DOCUMENTS

| | | | | |
|---|---|---|---|---|
| 3,463,334 A * | 8/1969 | Longmire et al. | ....... | 244/137.1 |
| 3,552,587 A * | 1/1971 | Warren | ..................... | 244/137.1 |
| 3,693,761 A * | 9/1972 | Fitzgibbon | .................. | 187/411 |
| 4,022,404 A * | 5/1977 | Greiss | ..................... | 244/118.5 |
| 4,055,317 A * | 10/1977 | Greiss | ..................... | 244/118.5 |
| 4,653,707 A * | 3/1987 | Hamilton et al. | ........ | 244/137.2 |
| 4,858,855 A * | 8/1989 | Dalbera | .................. | 244/137.1 |
| 5,322,244 A * | 6/1994 | Dallmann et al. | ........ | 244/118.5 |
| 5,558,181 A * | 9/1996 | Bundo | .......................... | 187/270 |
| 5,797,185 A * | 8/1998 | Sammataro et al. | ........ | 29/893.3 |
| 6,340,136 B1 * | 1/2002 | Luria | ....................... | 244/118.1 |
| 6,808,142 B2 * | 10/2004 | Oki | .......................... | 244/118.1 |
| 7,137,593 B2 * | 11/2006 | Baatz | ...................... | 244/118.5 |
| 2005/0211832 A1* | 9/2005 | Baatz | ...................... | 244/118.1 |
| 2006/0186268 A1* | 8/2006 | Harrington et al. | ...... | 244/118.5 |

FOREIGN PATENT DOCUMENTS

WO  WO 00/30422  9/2004

* cited by examiner

*Primary Examiner*—Stephen Holzen
(74) *Attorney, Agent, or Firm*—Christopher Paradies; Fowler White Boggs Banker P.A.

(57) ABSTRACT

An aircraft incorporates a lift system for guiding a lift cabin. The lift cabin 21 is capable of servicing several decks in the aircraft. A guiding structure is mounted inside the aircraft fuselage 1 by mounting it to the floor and deck structures, while allowing for strains between the floor and the deck in the vertical direction. The lift cabin is capable of travelling down to the ground if a door in the underside of the fuselage is provided. The lift cabin is arranged on the guiding structure using a bogie truck mounted on the lift cabin, and the bogie truck may be actively connected with profile rails of the guiding structure via roll blocks. The part of the bogie truck carrying the roll blocks or other guiding element may remain within the fuselage, when the cabin is positioned on the ground.

12 Claims, 2 Drawing Sheets

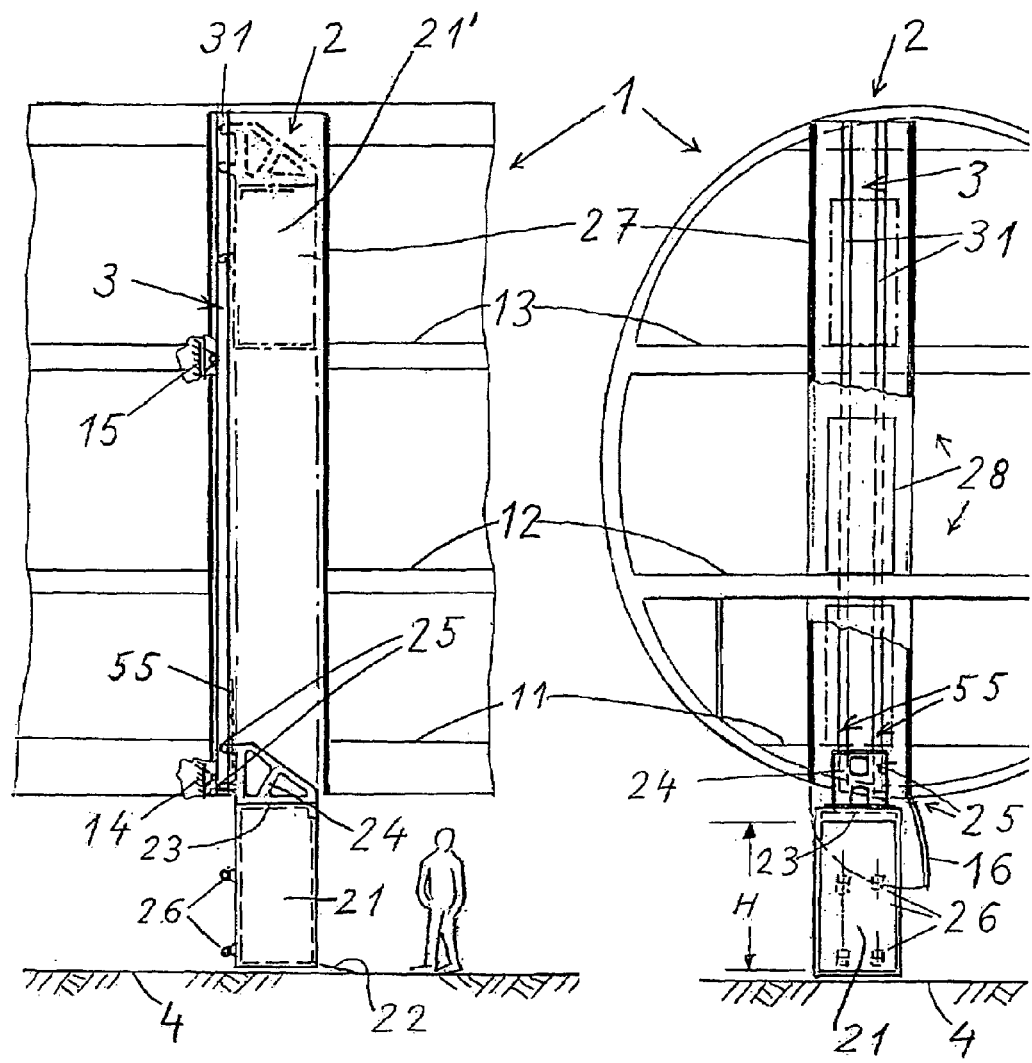

AIRCRAFT WITH A LIFT SYSTEM

RELATED APPLICATIONS

This application claims the benefit of the filing date of U.S. Provisional Patent Application No. 60/631,335 filed Nov. 29, 2004 and of German Patent Application No. 10 2004 046 146.5 filed Sep. 23, 2004, the disclosures of which are hereby incorporated herein by reference.

FIELD OF THE INVENTION

The invention relates to lift systems for aircraft, particularly to aircraft with multiple decks.

BACKGROUND

The steady rise in air traffic is being accompanied by the increased use of double-decker aircraft. The use of onboard lifts to transport cargo between the decks in such airplanes is known from WO 00/30422, for example. In addition, it is desirable in such aircraft that the lift also be able to approach another lower level and service the landing strip level. This document here provides for a scissor lift to lower cargo comprised of boxes, which directly handles the payload. Such a system does not enable passenger transport. Another mentioned solution involves a telescoping device, wherein an additional independently driven carriage travels out and down, lowering or raising the transport container with cargo. The additional independently driven carriage greatly increases the complexity, which adversely impacts maintenance and the weight of the lift system.

Given a lift capable of navigating at ground level, it is desirable to convey both cargo and passengers from the ground directly to the respective cabin deck, for which the conventional cargo area loading equipment are hardly suited.

U.S. Pat. No. 4,653,707 proposes an onboard lift that services various decks in the aircraft along with the landing strip level. The lift cabin exits through an opening in the fuselage and travels downward, transporting passengers or goods. The structure consists of a guide shaft secured in the aircraft, which envelops the actual cabin on all sides. In light of the guide function, the shaft must be able to traverse at least the distance to the ground. Since the shaft completely envelops the cabin as a force-conveying structural element, it must also be expected to be heavy. In addition, the drive consists of ropes and pulleys, making it complicated and high-maintenance.

RH:ar

SUMMARY

An aircraft according to the present invention incorporates a lift. The aircraft may include a plurality of decks, a fuselage having an opening on an underside and a hatch or door capable of closing the opening. A guiding structure having profile rails is mounted within a shaft through the plurality of decks, which may be aligned with the opening in the underside of the fuselage. A lift system is mounted on the guiding structure. The lift system includes a bogie truck mounted on a cabin and coupled to the guiding structure by guiding elements. For example, the bogie truck may be mounted to the lift cabin roof. A portion of the bogie truck is arranged such that the guiding elements remain within the fuselage, when the cabin is lowered to the ground and the cabin is completely free of the fuselage.

A lift according to the present invention is configurable to enable lowering of the lift to ground level. Embodiments have less weight and require less maintenance than known lifts using in aircraft. The lift may have a compact structure and may avoid complexity in the design and functioning of the lift. An embodiment may be designed without the need for telescoping systems and cable winches, for example.

The lift offers many other advantages as described in the detailed description. For example, an aircraft incorporating the lift of the present invention is capable of being serviced rapidly from the ground without interfering with cleaning, maintenance and security operations.

BRIEF DESCRIPTION OF THE DRAWINGS

The drawings provide some examples and should not be used to limit the present invention.

FIG. 1 illustrates a longitudinal section through an aircraft fuselage with a lift system;

FIG. 2 is a cross section through the aircraft fuselage with a lift system;

DETAILED DESCRIPTION

The detailed description and drawings provide some examples of the present invention, which should not be used to limit the scope of the present invention. Instead, the present invention should be limited only to the claims that eventually issue.

Figure 3:
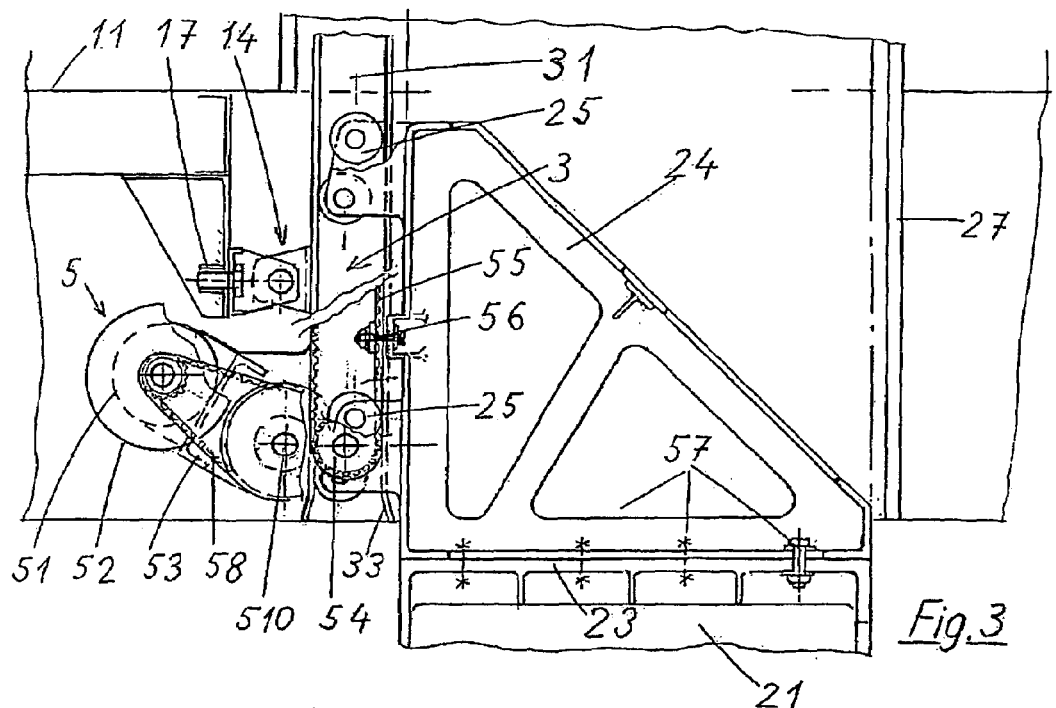
FIG. 3 is a section in the vertical plane of the lower lift area.

In FIG. 1 an aircraft is illustrated having a fuselage 1 with three levels: a cargo area floor 11, a main deck 12 and an upper deck 13. A lift cabin 2.1 may be lowered to the landing strip 4. For use by wheelchair-bound persons, a small ramp 22 may be provided. The lift cabin 21 travels into a guide structure 3 by way of a bogie truck 24 secured to the cabin roof 23. The bogie truck 24 may be detachably secured with connecting elements 57, as shown in FIG. 3, or by any other fasteners or joining mechanism, such as adhesive bonding, welding, slide locking or a combination of these.

In one embodiment, when the lift cabin 21 travels into the lowest position, guide elements 25 of the bogie truck 24 are situated completely inside profile rails 31 in the fuselage 1, while the cabin 21 is completely exposed. This arrangement of the guide structure 3 and lift cabin 21 with mounted bogie truck 24 allows the cabin 21 to have any height, while still allowing the cabin 21 to reach the ground. For example, it may have a height sufficient for use by passengers, crew and servicing personnel. The bogie truck 24 may be designed to have a light weight compared to the weight of the cabin. The bogie truck 24 is guided via the guiding elements 25.

In the drawing of FIG. 2, one embodiment of an aircraft according to the present invention is illustrated having dimensions of a large capacity double-level aircraft. The cabin 21 has a height H. In one example, the height H is about 2 meters, which is selected as a height capable of accommodating the height of passengers in the cabin 21. The height of the bogie truck 24 may be defined as the distance between the upper and lower guiding elements 25. The height of the bogie truck 24 may be selected based on the distance to the ground and the space available within the fuselage shell 1 in the top lift position 21. In one example, the distance between the guiding elements 25 is selected to be at least large enough to compensate for the forces generated by the tilting moment of the cabin 21, when the cabin 21 travels out of the fuselage 1. The distance between the guiding elements provides a lever arm that reduces the load and may be designed such that the loads are substantially less than the maximum loads supportable by the guiding elements 25.

Since transverse forces are also encountered during flight, as opposed to ground operations, additional guiding elements 26 are provided as needed to provide additional support during operation while in flight solely within the fuselage shell 1. These additional guiding elements 26 may exit the guiding structure 3 during egress of the cabin 21 from the fuselage 1. Upon entry into the fuselage 1, these additional guiding elements 26 provide additional guidance, so that the cabin 21 rests on a wider base as it traverses the interior of the fuselage 1. This feature offers an additional advantage of preventing any substantial impact with the lift shaft 27, even if the gap between the cabin 21 and the lift shaft 27 is small.

The guiding structure 3 may comprise two profile rails 31, in which the guiding elements 25, 26 run, roll and/or slide. The rails 31 may be rigidly interconnected. The guiding structure 3 may constitute the driving structure for movement of the cabin 21. In one example, the lift is driven via low-noise toothed belts 55, which are coupled to the bogie truck 24 as illustrated in FIGS. 3 and 4.

Figure 4:
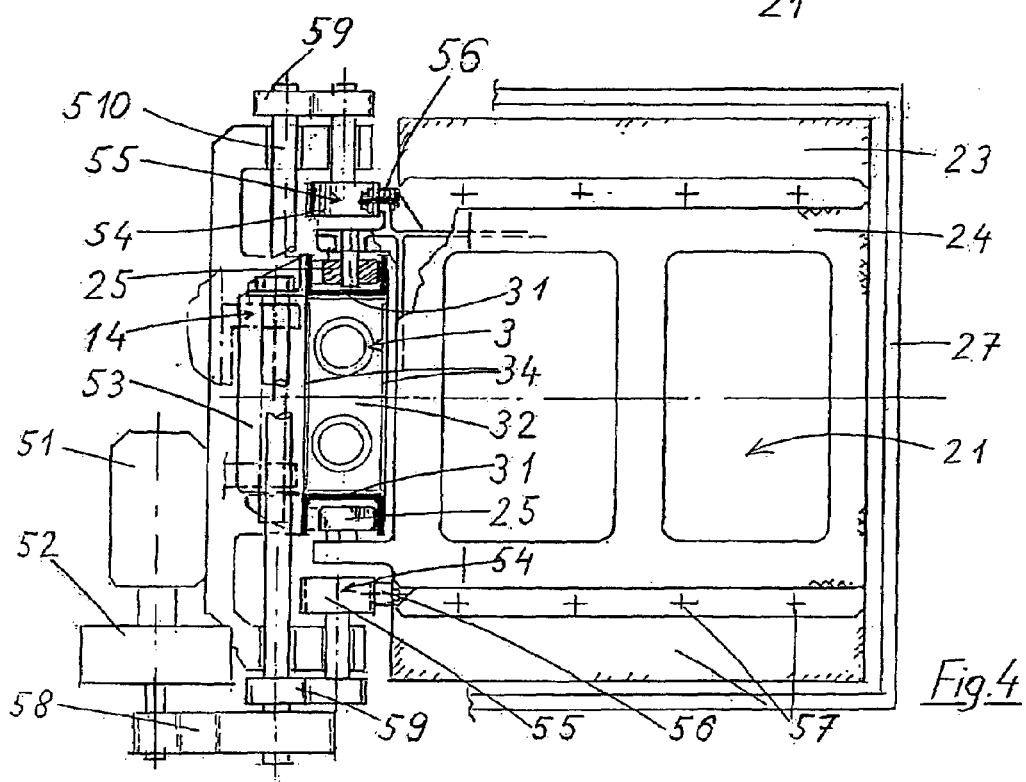
FIG. 4 is a section in the horizontal plane of the lower lift area.

For example, the guiding structure 3 may be designed as a torsionally resistant box, as illustrated in FIG. 4. In one embodiment, to ensure that lift operation is unaffected by fuselage deformation, the guiding structure 3 is secured by a fixed bearing 14 and a movable bearing 15 connected to the fuselage 1 in a statically defined manner. The fixed bearing 14 is capable of absorbing forces in each of the x, y, and z directions, while the movable bearing 15 is capable of countering forces only in the xy plane. Thus, the lift shaft 27 may be comprised of cladding and may have a comparatively light structure due to the absence of substantial contact between the components of the lift and the cladding of the shaft 27.

On the fuselage underside a door 16, also referred to as a flap, may be provided for ensuring lift egress and pressure tightness when closed, as shown in FIG. 2. The lift shaft 27 may be centered, such that the shaft is located between two isles, or may be disposed off-center, as shown in FIG. 2, such that the shaft may be located adjacent to a central aisle, whichever offers advantages in terms of lift access and seating arrangement. The shaft 27 has doors 28 on each deck. The door in the cargo area may have a shorter height than the height of the doors in the passenger compartments, for example.

The lower lift area, as illustrated in FIG. 3, has profile rails 31, bogie truck 24, lift cabin 21, fixed bearings 14 and drive 5. The drive motor 51 with coupling-braking unit 52 coupled thereto sits on a bearing block 53, which may be directly coupled with the guiding structure 3. For example, the drive 5 may form a single unit with the guiding structure 3, which has the advantage of remaining unaffected by any fuselage cell deformation, which may occur during flight operations.

In the example shown, two toothed belts 55 are driven by drive elements and by two driving wheels 54 each secured laterally to the structure 3. These have deflection pulleys above in the fuselage, which allow adjustment of belt tension. The two toothed belts 55 are connected by coupling elements 56 with the bogie truck 24. Since the guiding elements 25 absorb the transverse forces or the counter forces from the cabin moment, only longitudinal forces, in a z-direction, act on the toothed belts 55 at the coupling elements 56. The guiding elements 25 are depicted as roller pairs in the drawing; however, other solutions may be used, such as sliding blocks made of plastic and any other mechanism that provides low friction raising and lowering of the cabin 21. The bogie truck 24 is mounted to the cabin roof 28 by screws or bolts 57 inserted through a flange; however any other fastener or bonding agent may be used to secure the bogie truck 24 to the cabin 21. Preferably, the bogie truck is removably secured, enabling a separation for maintenance-related disassembly. The bogie truck 24 may also be detached via the coupling elements 56 from the toothed belts 55, which may be changed out periodically, as required by a maintenance schedule or upon inspection. In this example, the toothed belts 55 are particularly easy to assemble, because they lie outside the guiding structure 3.

In an alternative embodiment, the fixed bearing 14 may be formed as gimbals, if needed. This is denoted on the drawing by an additional rotational axis 17. The forces acting on the guiding structure 3 are in this way partially absorbed by the spars of the aircraft structure, e.g., the cargo area floor 11. The remaining forces are released on the movable bearing 15 located further up. To better thread the additional guiding elements 26 as the cabin 21 ascends, the profile rails 31 are somewhat conical at the lower end, denoted here as an inclined profile catch 33.

Drive solutions other than the one described for driving the toothed belts 55 may be used. For example, individual drive elements could be flanged directly to the guiding structure 3 without a bearing block 53, wherein the connecting shaft 510 could under certain conditions come to lie inside the profile rails 31. The guiding elements 25 lying below (track rollers in the drawing) may have to edge higher on the bogie truck 24 in order for this alternative arrangement to fit in the space provided.

FIG. 4 shows a section of FIG. 3 in a horizontal projection. The lift shaft 27 envelops the lift cabin 21 without any contact. Since all forces emanating from the lift movement are absorbed by the guiding structure 3 and/or the profile rails 31, the lift shaft 27 can be merely designed as a light cladding. The profile rails 31 together with the webs 32 and cover plates 34 form the integral guiding structure 3. The guiding elements 25, which are here depicted as track rollers, move in the profile rails 31. These may be hinged to the bogie truck 24, which may be made of light metal or plastic, and may only negligibly increase the weight of the entire cabin unit. The toothed belts 55 may be arranged to the side of the guiding structure 3, which facilitates assembly and disassembly. The connection to the bogie truck 24 is established via coupling elements 56.

For example, the drive motor 51 acts by way of a coupling-braking unit 52, e.g., via driving belt 58, on a gear transmission 59, which moves a driving wheel 54. The gear transmission 59 ensures that the opposing toothed belt 55 is driven by the connecting shaft 510. All drive units and shafts may be secured to the bearing block 53, which is in turn screwed to the guiding structure 3. This ensures that lifting operations can take place independently of the elastic deformations of the fuselage 1, which may be encountered in flight operations.

The drive train from the motor 51 to the gear transmission 59 may be realized as self-inhibiting gearing or some other configuration, as requirements warrant. The toothed belts 55 may be arranged in any other way, such as having one half of the belt run inside the guiding structure 3, while the other half is connected outside with the bogie truck 24 via the coupling elements. This solution has the advantage of yielding a more compact design. However, this solution may not be as easy to assemble and disassemble. Trade-offs between easy assembly and disassembly and compactness are allowed by the design of the drive system shown in FIG. 4.

Many other systems may be used or combined with the systems described for achieving desired performance requirements and will be readily apparent based on the examples of lift systems described and illustrated herein.

REFERENCE LIST

1 Aircraft fuselage
  11 Cargo area floor
  12 Main deck
  13 Upper deck
  14 Fixed bearing
  15 Movable bearing
  16 Fuselage flap
  17 Rotational axis
2 Lift
  21 Cabin, 21'—top position
  22 Ramp
  23 Cabin roof
  24 Bogie truck
  25 Guiding elements
  26 Additional guiding elements
  27 Lift shaft
  28 Shaft door
3 Guiding structure
  31 Profile rails
  32 Connecting webs
  33 Inclined profile set
  34 Cover plates
4 Landing strip
5 Driving block
  51 Drive motor
  52 Coupling-braking unit
  53 Bearing block
  54 Drive wheel
  55 Toothed belt
  56 Coupling element
  57 Connecting elements
  58 Driving belt
  59 Gear transmission
  510 Connecting shaft H Dimensional measure=about 2 m

What is claimed is:

1. An aircraft, comprising:
several decks;
an aircraft fuselage comprising an opening on an underside thereof;
a guiding structure comprising profile rails; and
a lift system, the lift system comprising:
a bogie truck;
guiding elements; and
a lift cabin;
wherein the guiding structure is supported inside the aircraft fuselage;
wherein the lift cabin is arranged on the guiding structure by the bogie truck, the bogie truck being arranged above a lift cabin roof of the lift cabin;
wherein the bogie truck is actively connected with the profile rails of the guiding structure via the guiding elements;
wherein the lift system is adapted to guide the lift cabin;
wherein the lift cabin is adapted to service the several decks, is adapted to be traversable on the guiding structure and is further adapted to travel down to a landing strip through the opening on the underside of the fuselage; and
wherein the lift system is further adapted in such a way that a part of the bogie truck which carries the guiding elements remains in the fuselage in a bottom lift position, while the lift cabin is entirely driven out of the fuselage.

2. The aircraft according to claim 1, further comprising additional guiding elements;
and an inclined profile catch;
wherein the additional guiding elements are secured to the lift cabin; and
wherein the additional guiding elements are adapted to be introducable into the profile rails from the bottom lift position during upward movement by way of the inclined profile catch.

3. The aircraft according to claim 1, wherein the guiding elements are formed as track rollers or sliding bodies.

4. The aircraft according to claim 1, wherein the lift system further comprises connecting elements, and
wherein the bogie truck comprises light metal or fiber-reinforced plastic, and is adapted to be detachably assembled with the lift cabin roof by the connecting elements.

5. The aircraft according to claim 1, further comprising a lift drive;
wherein the lift drive is actively connected with the bogie truck; and
wherein the lift drive is designed as a toothed belt drive having toothed belts.

6. The aircraft according to claim 5, the lift system further comprising:
coupling elements;
wherein the coupling elements are situated outside the guiding structure; and wherein the toothed belts are actively connected with the bogie truck via the coupling elements.

7. The aircraft according to claim 5, the lift system further comprising:
coupling elements;
wherein the toothed belts which are actively connected with the bogie truck are situated partially inside the guiding structure and are adapted in such a way that one half of the toothed belts rotates inside the guiding structure, while the other half of the toothed belts is connected with the bogie truck via the coupling elements outside the guiding structure.

8. The aircraft according claim 5, wherein the lift drive comprises:
a drive motor;
a drive wheel;
a coupling-braking unit; and
a transmission means;
wherein the drive wheel is coupled to the transmission means and is adapted to power the toothed belts.

9. The aircraft according to claim 1, wherein the lift system further comprises a lift shaft;
wherein the lift cabin is situated inside the lift shaft; and
wherein the lift cabin is adapted to be guided inside the lift shaft without any contact.

10. The aircraft according to claim 9, wherein the lift shaft is made out of light structural elements.

11. The aircraft according to claim 1, wherein the guiding structure further comprises:

connecting webs; and
cover plates;
wherein the guiding structure is designed as a distortion-resistant and rigid torsional box by using the profile rails, the connecting webs and the cover plates.

12. The aircraft according to claim 1, further comprising a lift drive, wherein the lift drive is mounted to the guiding structure.

* * * * *